US008454755B1

(12) United States Patent
Tan et al.

(10) Patent No.: US 8,454,755 B1
(45) Date of Patent: Jun. 4, 2013

(54) METHODS FOR EVACUATING PARTICLES FROM A HARD DRIVE COMPONENT

(71) Applicant: Western Digitial Technologies, Inc., Irvine, CA (US)

(72) Inventors: Jit Han Tan, Petaling Jaya (MY); Wai Khuen Yee, Bandar Tun Razak (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/674,896

(22) Filed: Nov. 12, 2012

Related U.S. Application Data (62) Division of application No. 12/794,678, filed on Jun. 4, 2010, now Pat. No. 8,327,529.

(51) Int. Cl.
*B08B 5/04* (2006.01)

(52) U.S. Cl.
USPC ...... 134/21; 134/22.1; 134/22.11; 134/22.12; 134/22.18; 29/603.03

(58) Field of Classification Search
None
See application file for complete search history.

(56) References Cited

U.S. PATENT DOCUMENTS

| 6,681,659 | B2 | 1/2004 | Hoe et al. |
| 6,710,978 | B2 | 3/2004 | Holaway et al. |
| 6,790,133 | B2 | 9/2004 | Nuno |
| 7,194,795 | B2 | 3/2007 | Jenneke |
| 7,397,631 | B1 | 7/2008 | Suwito et al. |
| 7,546,216 | B2 | 6/2009 | Herdendorf et al. |
| 8,162,366 | B1 | 4/2012 | Tan et al. |
| 8,327,529 | B1 | 12/2012 | Tan et al. |
| 2007/0185616 | A1 | 8/2007 | Murray et al. |
| 2009/0119907 | A1 | 5/2009 | Ho et al. |

OTHER PUBLICATIONS

Office Action dated May 4, 2012 from U.S. Appl. No. 12/794,678, 10 pages.
Notice of Allowance dated Aug. 8, 2012 from U.S. Appl. No. 12/794,678, 6 pages.

*Primary Examiner* — Michael Kornakov
*Assistant Examiner* — Ryan Coleman (57) ABSTRACT

An assembly tool is provided. The assembly tool comprises a body, a first vacuum channel defined within the body, and a first locating pin attached to the body. The first locating pin has a shaft portion arranged within a surrounding portion of the body. The first locating pin is configured to engage a first alignment feature of a hard drive component at a first contact area to align the hard drive component with the assembly tool. The body is configured to couple the first vacuum channel to a vacuum source and to facilitate particle evacuation from the first contact area via the first vacuum channel when a vacuum is applied by the vacuum source.

3 Claims, 9 Drawing Sheets

METHODS FOR EVACUATING PARTICLES FROM A HARD DRIVE COMPONENT

CROSS-REFERENCE TO RELATED APPLICATIONS

This application is a divisional of U.S. patent application Ser. No. 12/794,678, filed on Jun. 4, 2010, which is hereby incorporated by reference in its entirety.

FIELD

The present invention generally relates to manufacturing and assembly equipment and, in particular, relates to systems and methods for evacuating particles from a hard drive component.

BACKGROUND

During hard drive assembly processes, hard drive assembly tools may use locating pins to engage hard drive components for aligning the hard drive components with the hard drive assembly tools. However, contact between the locating pins and the hard drive components may result in abrasion and the shedding of particles from the locating pins and/or hard drive components during the hard drive assembly processes. These particles may contaminate hard drives during their assembly, which may result in reduced reliability and/or failure of the hard drives. Thus, it is desirable to minimize the amount of particles that hard drives are exposed to during their assembly, particularly during the alignment of hard drive components using locating pins.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

During hard drive assembly processes, hard drive assembly tools may use locating pins to engage hard drive components for aligning the hard drive components with the hard drive assembly tools. Hard drive assembly tools may include, for example and without limitation, headstack grippers, top voice-coil magnet (TVCM) grippers, TVCM presenter nests, and breather filter install (BFI) nests. Hard drive components may include, for example and without limitation, headstacks, TVCMs, and top covers of hard drives. Contact between the locating pins and the hard drive components may result in abrasion and the shedding of particles from the locating pins and/or hard drive components during the hard drive assembly processes. These particles may contaminate hard drives during their assembly, which may result in reduced reliability and/or failure of the hard drives. Thus, it is desirable to minimize the amount of particles that hard drives are exposed to during their assembly, particularly during the alignment of hard drive components using locating pins. Aspects of the subject technology provide systems and methods for evacuating these particles.

Figure 1A:
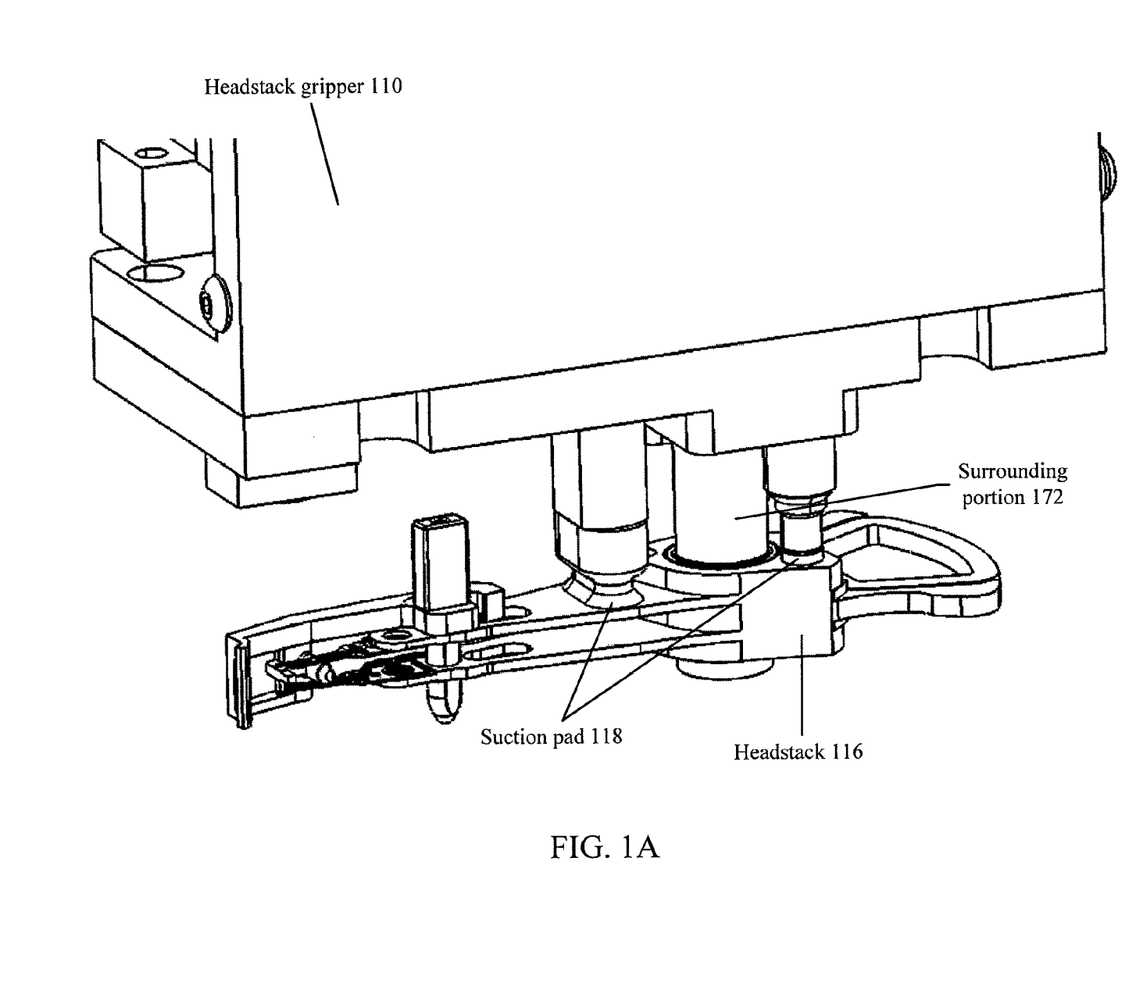
FIGS. 1A and 1B illustrate a headstack gripper as an example of an assembly tool, and a headstack as an example of a hard drive component, in accordance with various aspects of the subject technology.
Figure 1B:
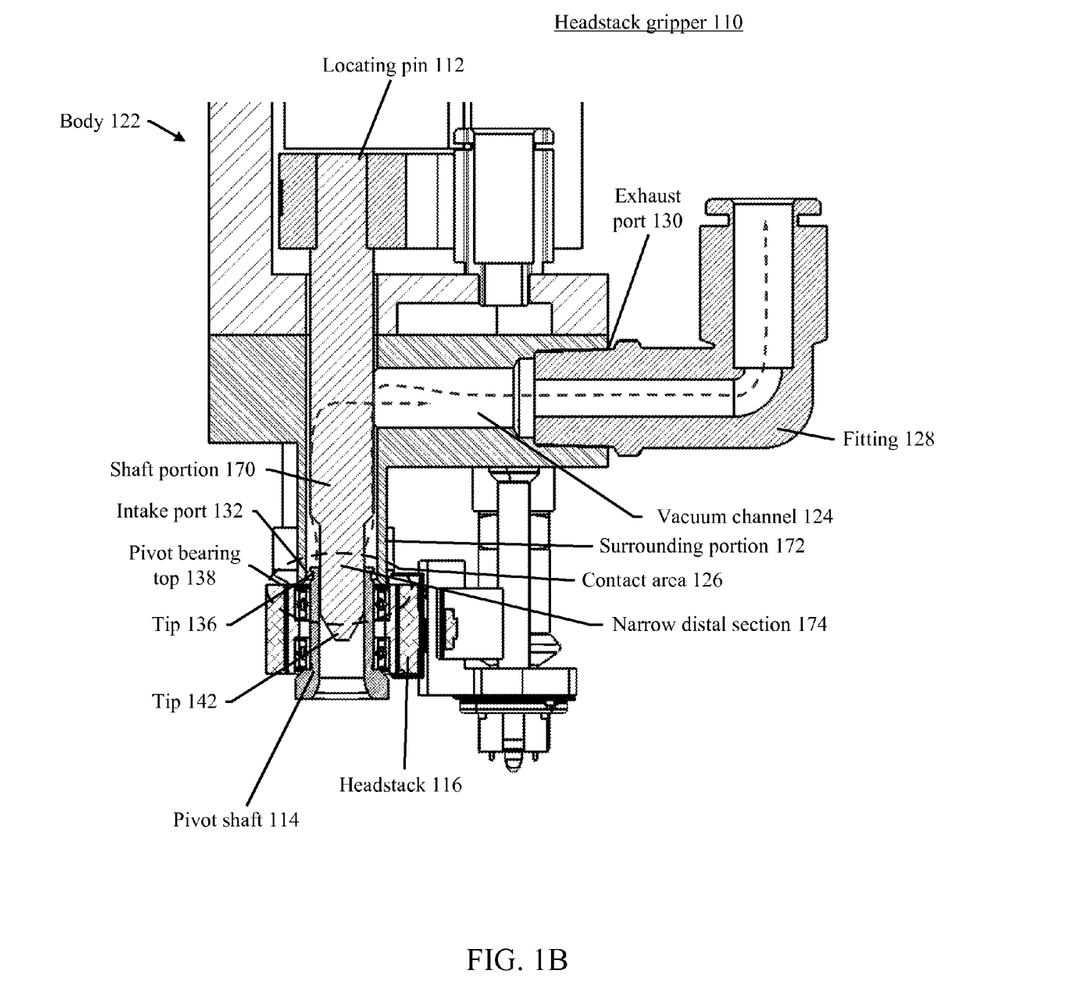

FIGS. 1A and 1B illustrate headstack gripper 110 as an example of an assembly tool, and headstack 116 as an example of a hard drive component, in accordance with various aspects of the subject technology. In particular, FIG. 1A illustrates a perspective view of headstack gripper 110 and headstack 116. Headstack gripper 110 is used to pick headstack 116 from a shipping tray, for example, and to place headstack 116 onto a hard disk assembly. Headstack gripper 110 picks headstack 116 by means of suction, utilizing one or more suction pads 118 to provide the suction/vacuum seal. According to various aspects of the subject technology, a locating pin within surrounding portion 172 of headstack gripper 110 engages a pivot shaft of headstack 116 to align headstack 116 with headstack gripper 110. The locating pin may engage the pivot shaft by slide fit and may precisely align headstack 116 with headstack gripper 110.

In some aspects, the locating pin may be made of hardened stainless steel (e.g., grade 440C stainless steel) to have sufficient strength for repeated usage in high volume manufacturing of hard drives. In this regard, the locating pin may be made of harder material than the pivot shaft, which is typically made of grade 300 series stainless steel. Thus, contact between the locating pin and the pivot shaft may result in abrasion and the generation of particles from the locating pin and/or the pivot shaft. According to various aspects of the subject technology, systems and methods are provided for evacuating these particles.

FIG. 1B illustrates a cross-sectional view of headstack gripper 110 and headstack 116 shown in FIG. 1A, in accordance with various aspects of the subject technology. Headstack gripper 110 comprises body 122, vacuum channel 124 defined within body 122, and locating pin 112 attached to body 122. Locating pin 112 has shaft portion 170 arranged within surrounding portion 172 of body 122. Surrounding portion 172 may comprise a sleeve, for example. Locating pin 112 is configured to engage pivot shaft 114, which is an example of an alignment feature, of headstack 116. Locating pin 112 is configured to engage pivot shaft 114 of headstack 116 at contact area 126 to align headstack 116 with headstack gripper 110. For example, locating pin 112 may be inserted into pivot shaft 114 through an opening at tip 136 of pivot shaft 114 such that locating pin 112 engages an inner wall of pivot shaft 114 by slide fit. Contact area 126 may comprise a pivot shaft surface of headstack 116.

According to various aspects of the subject technology, body 122 is configured to couple vacuum channel 124 to a vacuum source (not shown) and to facilitate particle evacuation from contact area 126 via vacuum channel 124 when a vacuum is applied by the vacuum source. Vacuum channel 124 comprises a path beginning from intake port 132, through a space between shaft portion 170 and surrounding portion 172, through body 122, and through exhaust port 130. In some aspects, headstack gripper 110 comprises fitting 128 mounted to exhaust port 130 of vacuum channel 124. Fitting 128 is configured to couple the vacuum source to exhaust port 130.

In some aspects, intake port 132 is oriented towards contact area 126. For example, intake port 132 may face contact area 126. Thus, when particles are generated as a result of the contact between locating pin 112 and pivot shaft 114, the vacuum may be applied to evacuate the particles from contact area 126 via vacuum channel 124 (e.g., as illustrated by the path of the dotted arrows in FIG. 1B). For example, the particles may be evacuated from contact area 126 through intake port 132, through the space between shaft portion 170 and surrounding portion 172, through body 122, and through fitting 128 toward the vacuum source. In some aspects, a filter may be placed between vacuum channel 124 and the vacuum source to capture the particles evacuated from contact area 126.

In some aspects, the vacuum applied may be sufficiently strong to evacuate the particles from contact area 126. For example, the vacuum may be applied at a pressure of 26 inches of Mercury (in Hg). In some aspects, the vacuum may be applied such that a flowrate of 350 liters per minute (l/min) through vacuum channel 124 is created. According to various aspects of the subject technology, the vacuum may be continuously applied when locating pin 112 engages pivot shaft 114. In some aspects, the vacuum may be applied before locating pin 112 engages pivot shaft 114. In some aspects, the vacuum may be applied until after locating pin 112 has disengaged from pivot shaft 114 (e.g., when headstack gripper 110 has finished placing headstack 116 onto a hard disk assembly).

In some aspects, tip 142 of locating pin 112 extends distally beyond intake port 132 of vacuum channel 124, as shown in FIG. 1B. In some aspects, the sleeve of surrounding portion 172 surrounds tip 136 of pivot shaft 114 when locating pin 112 engages pivot shaft 114. In this regard, particles generated in contact area 126 between locating pin 112 and pivot shaft 114 may be prevented from escaping beyond an interior within surrounding portion 172 and/or pivot shaft 114 when locating pin 112 engages pivot shaft 114. In some aspects, a separation between the sleeve of surrounding portion 172 and pivot bearing top 138 of headstack 116 is sufficiently narrow to prevent particles from escaping beyond the interior. For example, the separation between the sleeve of surrounding portion 172 and pivot bearing top 138 may be less than or equal to 0.20 millimeters and greater than or equal to 0.10 millimeters when locating pin 112 engages pivot shaft 114. In one example, this separation may be 0.20 millimeters, which may be sufficiently narrow to prevent particles from escaping beyond the interior and may allow enough separation to ensure that the sleeve of surrounding portion 172 does not contact pivot bearing top 138, which may cause abrasion and generate additional particles.

According to various aspects of the subject technology, a separation between an inner wall of surrounding portion 172 and shaft portion 170 may be sufficiently wide to allow the particles to evacuate through vacuum channel 124. For example, the particles may comprise diameters of 0.5 micrometers or less. In some aspects, the separation may be between 0.25 millimeters and 1.36 millimeters. In one example, this separation may be 0.39 millimeters, which may be sufficiently wide to allow the particles to evacuate from contact area 126 through vacuum channel 124. In some aspects, locating pin 112 may taper distally as shown in FIG. 1B to form narrow distal section 174 of shaft portion 170. Thus, the separation between the inner wall of the sleeve of surrounding portion 172 and shaft portion 170 may be greater at narrow distal section 174 of shaft portion 170. For example, the separation between the inner wall of the sleeve of surrounding portion 172 and shaft portion 170 at narrow distal section 174 may be between 0.39 millimeters and 1.36 millimeters. In one example, this separation may be 1.36 millimeters, which may be sufficiently wide to allow the particles to evacuate from contact area 126 through vacuum channel 124.

Figure 2A:
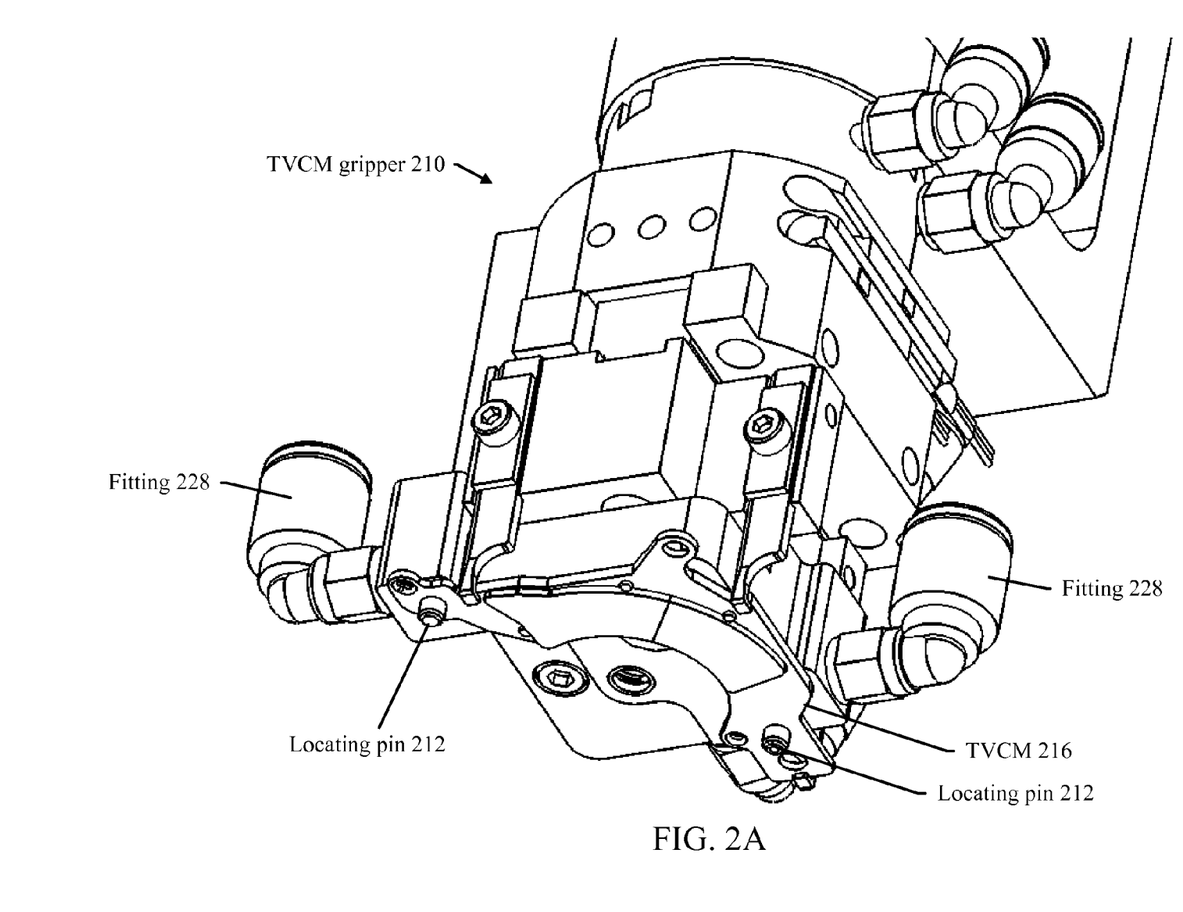
FIGS. 2A and 2B illustrate a top voice-coil magnet (TVCM) gripper as an example of an assembly tool, and a TVCM as an example of a hard drive component as a TVCM, in accordance with various aspects of the subject technology.
Figure 2B:
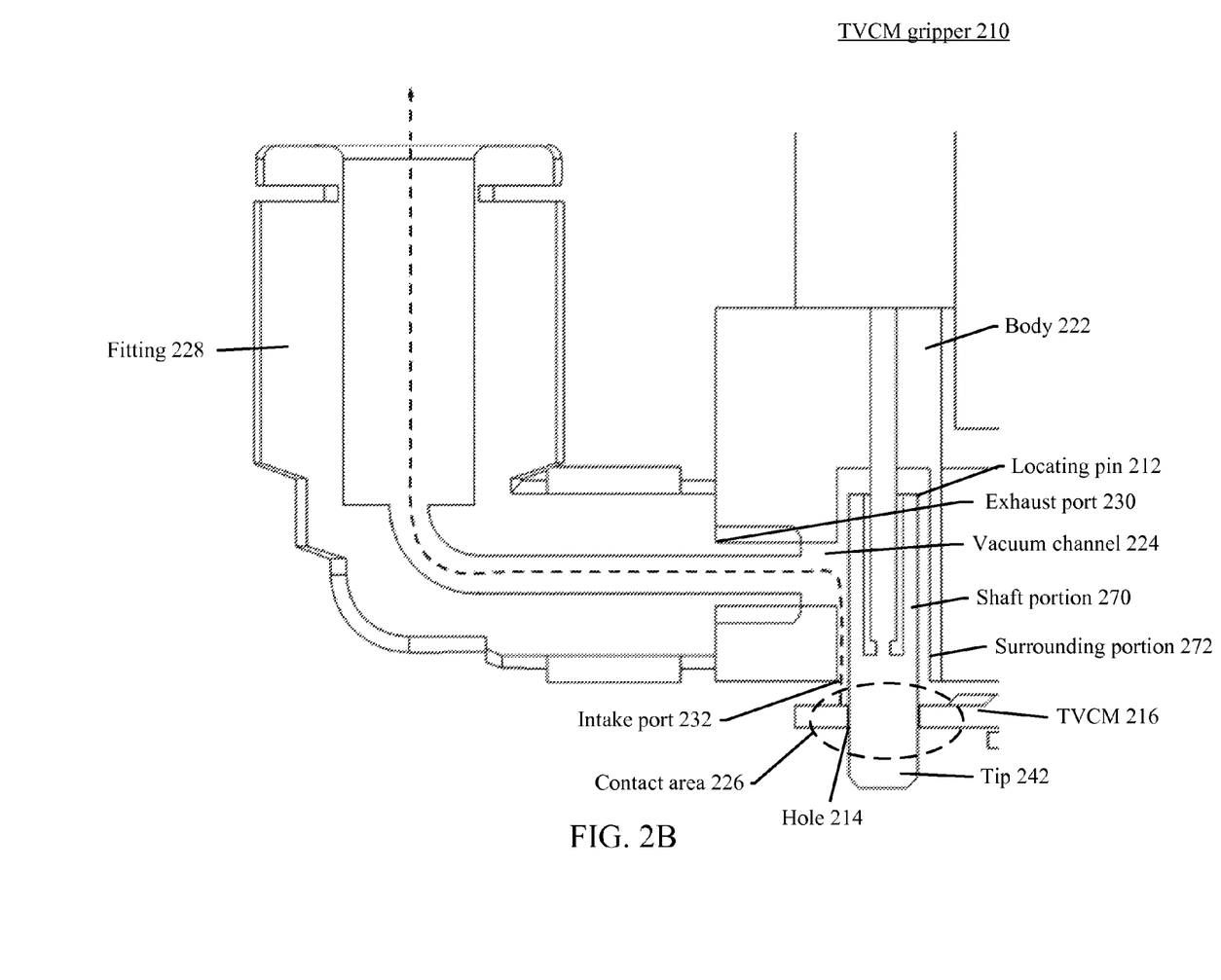

FIGS. 2A and 2B illustrate TVCM gripper 210 as an example of an assembly tool, and TVCM 216 as an example of a hard drive component, in accordance with various aspects of the subject technology. In particular, FIG. 2A illustrates a perspective view of TVCM gripper 210 and TVCM 216. TVCM gripper 210 may be used to pick TVCM 216 from a TVCM presenter nest or place TVCM 216 onto a TVCM presenter nest, for example. TVCM gripper 210 may also be used to place TVCM 216 onto a hard disk assembly. In some aspects, TVCM gripper 210 comprises two locating pins 212 configured to engage alignment features of TVCM 216. However, TVCM gripper 210 may comprise more or less locating pins depending on the size and shape of TVCM 216 for aligning TVCM 216 with TVCM gripper 210. In this example, the alignment features of TVCM 216 are holes which locating pins 212 may engage to align TVCM 216 with TVCM gripper 210. Particles generated as a result of contact between locating pins 212 and TVCM 216 may be evacuated in a manner similar to the examples presented in FIGS. 1A and 1B.

FIG. 2B illustrates a cross-sectional view of TVCM gripper 210 and TVCM 216 shown in FIG. 2A, in accordance with various aspects of the subject technology. Although TVCM gripper 210 comprises two locating pins 212 as shown in FIG. 2A, FIG. 2B illustrates only a portion of TVCM gripper 210 at one locating pin 212. However, the portion of TVCM gripper 210 at the other locating pin 212 is arranged similarly. TVCM gripper 210 comprises body 222, vacuum channel 224 defined within body 222, and locating pin 212 attached to body 222. Locating pin 212 has shaft portion 270 arranged within surrounding portion 272 of body 222. Locating pin 212 is configured to engage hole 214, which is an example of an alignment feature, of TVCM 216. Locating pin 212 may extend through hole 214 at contact area 226 to align TVCM 216 with TVCM gripper 210.

According to various aspects of the subject technology, body 222 is configured to couple vacuum channel 224 to a vacuum source (not shown) and to facilitate particle evacuation from contact area 226 via vacuum channel 224 when a vacuum is applied by the vacuum source. Vacuum channel 224 comprises a path beginning from intake port 232, through a space between shaft portion 270 and surrounding portion 272, through body 222, and through exhaust port 230. In some aspects, TVCM gripper 210 comprises fitting 228 mounted to exhaust port 230 of vacuum channel 224. Fitting 228 is configured to couple the vacuum source to exhaust port 230.

In some aspects, intake port 232 is oriented towards contact area 226. For example, intake port 232 may face contact area 226. Thus, when particles are generated as a result of the contact between locating pin 212 and TVCM 216, the vacuum may be applied to evacuate the particles from contact area 226 via vacuum channel 224 (e.g., as illustrated by the path of the dotted arrow in FIG. 2B). For example, the particles may be evacuated from contact area 226 through intake port 232, through the space between shaft portion 270 and surrounding portion 272, and through fitting 228 toward the vacuum source. In some aspects, a filter may be placed between vacuum channel 224 and the vacuum source to capture the particles evacuated from contact area 226.

In some aspects, the vacuum applied may be sufficiently strong to evacuate the particles from contact area 226. For example, the vacuum may be applied at a pressure of 26 inches of Mercury (in Hg). In some aspects, the vacuum may be applied such that a flowrate of 350 liters per minute (l/min) through vacuum channel 224 is created. According to various aspects of the subject technology, the vacuum may be continuously applied when locating pin 212 engages hole 214. In some aspects, the vacuum may be applied before locating pin 212 engages hole 214. In some aspects, the vacuum may be applied until after locating pin 212 has disengaged from hole 214 (e.g., when TVCM gripper 210 has finished placing TVCM 216 onto a TVCM presenter nest or a hard disk assembly).

In some aspects, tip 242 of locating pin 212 extends distally beyond intake port 232 of vacuum channel 224, as shown in FIG. 2B. According to various aspects of the subject technology, a separation between an inner wall of surrounding portion 272 and shaft portion 270 may be sufficiently wide to allow the particles to evacuate through vacuum channel 224. For example, the particles may comprise diameters of 0.5 micrometers or less. In some aspects, the separation may be between 0.25 millimeters and 1.36 millimeters. In one example, the separation may be 0.45 millimeters, which may be sufficiently wide to allow the particles to evacuate from contact area 226 through vacuum channel 224.

Figure 3A:
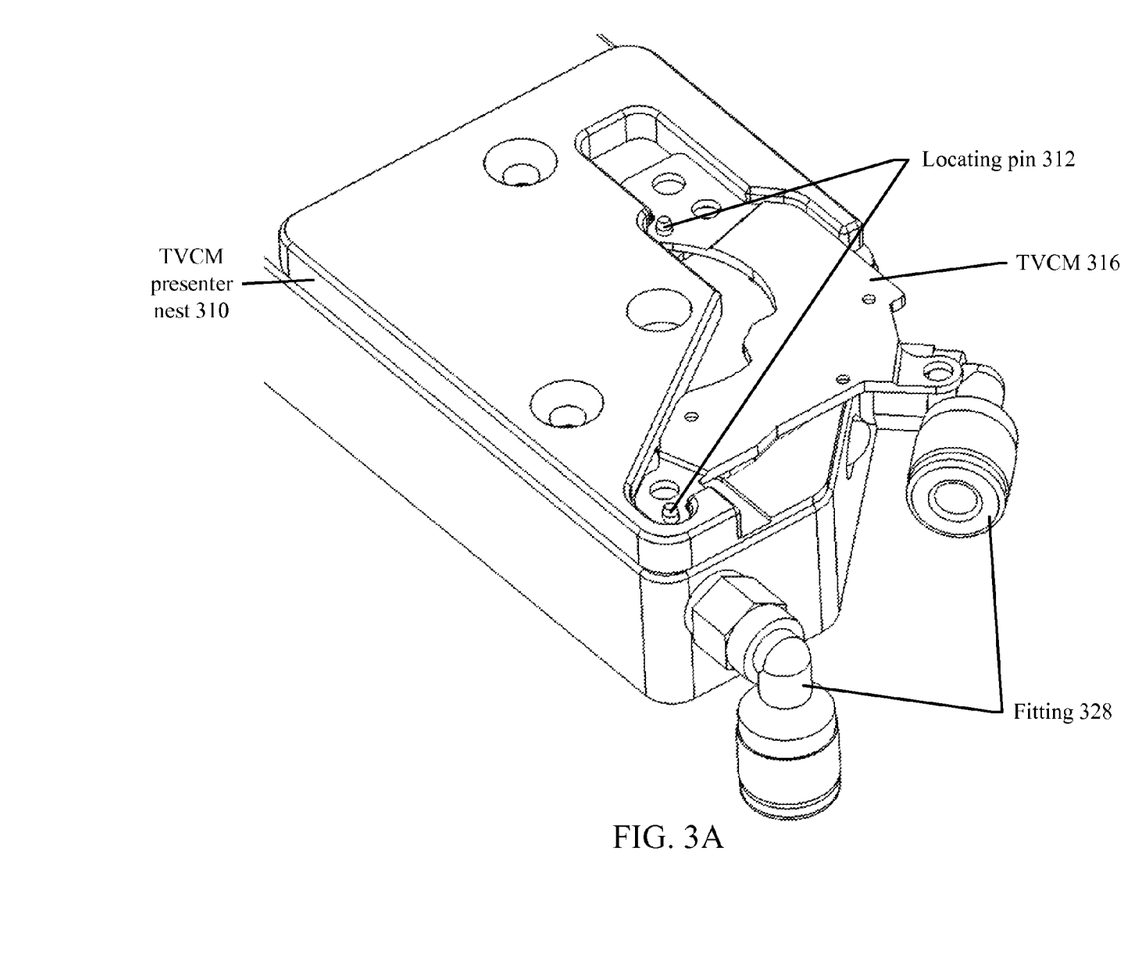
FIGS. 3A and 3B illustrate a TVCM presenter nest as an example of an assembly tool, and a TVCM as an example of a hard drive component, in accordance with various aspects of the subject technology.
Figure 3B:
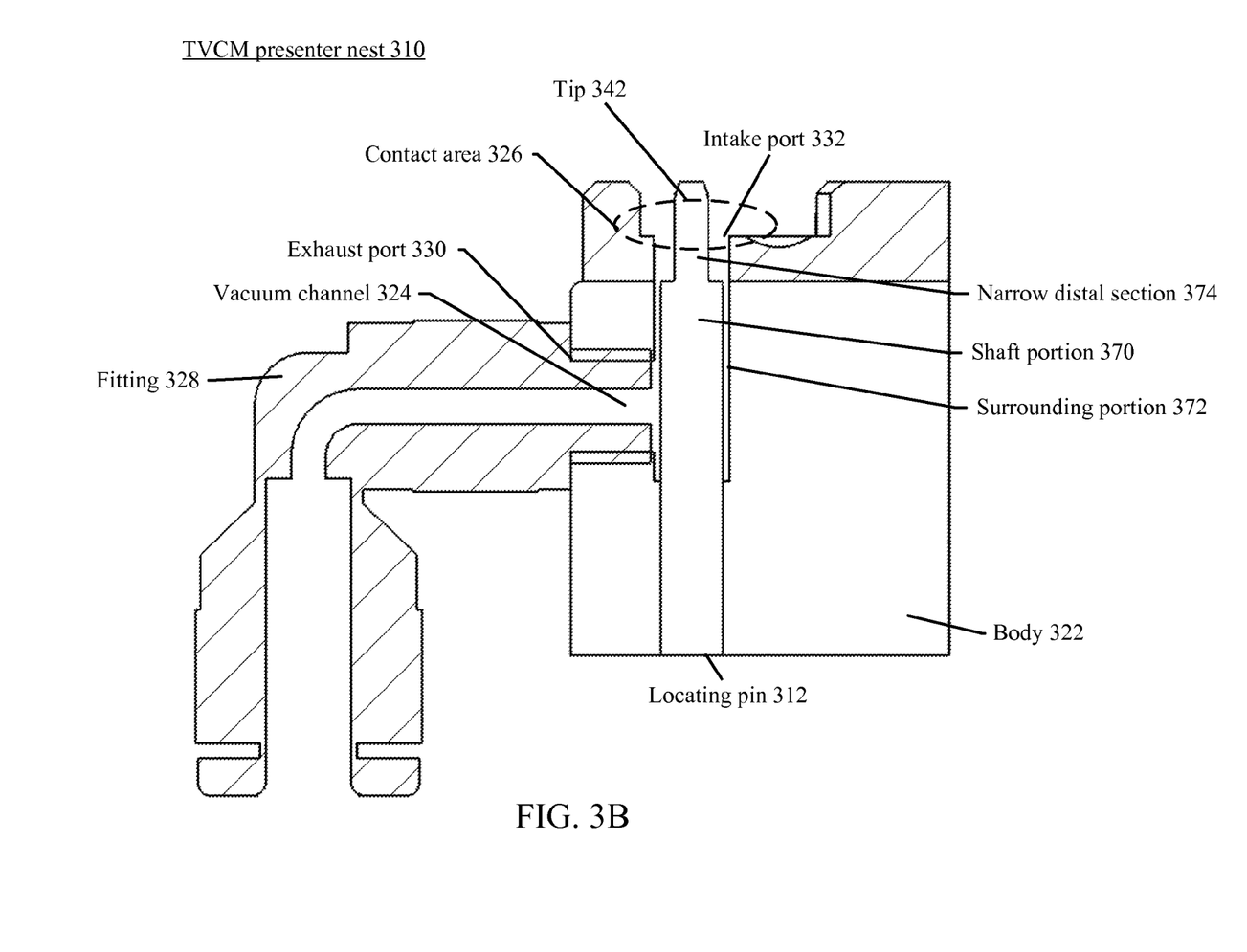

FIGS. 3A and 3B illustrate TVCM presenter nest 310 as an example of an assembly tool, and TVCM 316 as an example of a hard drive component, in accordance with various aspects of the subject technology. In particular, FIG. 3A illustrates a perspective view of TVCM presenter nest 310 and TVCM 316. Prior to installation onto a hard disk assembly, TVCM 316 may be placed onto TVCM presenter nest 310 so that a TVCM gripper, for example, may pick TVCM 316 from TVCM presenter nest 310 and place TVCM 316 onto the hard disk assembly. In some aspects, TVCM presenter nest 310 comprises two locating pins 312 configured to engage alignment features of TVCM 316. In this example, the alignment features of TVCM 316 are holes which locating pins 312 may engage to align TVCM 316 with TVCM presenter nest 310. However, TVCM presenter nest 310 may comprise more or less locating pins depending on the size and shape of TVCM 316 for aligning TVCM 316 with TVCM presenter nest 310. Particles generated as a result of contact between locating pins 312 and TVCM 316 may be evacuated in a manner similar to the examples presented in FIGS. 1A, 1B, 2A and 2B.

FIG. 3B illustrates a cross-sectional view of TVCM presenter nest 310 shown in FIG. 3A, in accordance with various aspects of the subject technology. Although TVCM presenter nest 310 comprises two locating pins 312 as shown in FIG. 3A, FIG. 3B illustrates only a portion of TVCM presenter nest 310 at one locating pin 312. However, the portion of TVCM presenter nest 310 at the other locating pin 312 is arranged similarly. TVCM presenter nest 310 comprises body 322, vacuum channel 324 defined within body 322, and locating pin 312 attached to body 322. Locating pin 312 has shaft portion 370 arranged within surrounding portion 372 of body 322. Locating pin 312 is configured to engage an alignment feature of TVCM 316 (e.g., shown in FIG. 3A). In this example, the alignment feature of TVCM 316 is a hole which locating pin 312 may extend through at contact area 326 to align TVCM 316 with TVCM presenter nest 310.

According to various aspects of the subject technology, body 322 is configured to couple vacuum channel 324 to a vacuum source (not shown) and to facilitate particle evacuation from contact area 326 via vacuum channel 324 when a vacuum is applied by the vacuum source. Vacuum channel 324 comprises a path beginning from intake port 332, through a space between shaft portion 370 and surrounding portion 372, through body 322, and through exhaust port 330. In some aspects, TVCM presenter nest 310 comprises fitting 328 mounted to exhaust port 330 of vacuum channel 324. Fitting 328 is configured to couple the vacuum source to exhaust port 330.

In some aspects, intake port 332 is oriented towards contact area 326. For example, intake port 332 may face contact area 326. Thus, when particles are generated as a result of the contact between locating pin 312 and TVCM 316, the vacuum may be applied to evacuate the particles from contact area 326 via vacuum channel 324. For example, the particles may be evacuated from contact area 326 through intake port 332, through the space between shaft portion 370 and surrounding portion 372, and through fitting 328 toward the vacuum source. In some aspects, a filter may be placed between vacuum channel 324 and the vacuum source to capture the particles evacuated from contact area 326.

In some aspects, the vacuum applied may be sufficiently strong to evacuate the particles from contact area 326. For example, the vacuum may be applied at a pressure of 26 inches of Mercury (in Hg). In some aspects, the vacuum may be applied such that a flowrate of 350 liters per minute (l/min) through vacuum channel 324 is created. According to various aspects of the subject technology, the vacuum may be continuously applied when locating pin 312 engages a hole of TVCM 316. In some aspects, the vacuum may be applied before locating pin 312 engages the hole of TVCM 316. In some aspects, the vacuum may be applied until after locating pin 312 has disengaged from the hole of TVCM 316 (e.g., when a TVCM gripper has finished picking TVCM 316 from TVCM presenter nest 310).

In some aspects, tip 342 of locating pin 312 extends distally beyond intake port 332 of vacuum channel 324, as shown in FIG. 3B. According to various aspects of the subject technology, a separation between an inner wall of surrounding portion 372 and shaft portion 370 may be sufficiently wide to allow the particles to evacuate through vacuum channel 324. For example, the particles may comprise diameters of 0.5 micrometers or less. In some aspects, the separation may be between 0.25 millimeters and 1.36 millimeters. In some aspects, shaft portion 370 may comprise narrow distal section 374. Thus, the separation between the inner wall of surrounding portion 372 and shaft portion 370 may be greater at narrow distal section 374. For example, the separation between the inner wall of surrounding portion 372 and shaft portion 370 at narrow distal section 374 may be 0.80 millimeters while the separation between the inner wall of surrounding portion 372 and shaft portion 370 at another section of shaft portion 370 may be 0.25 millimeters. These separations may be sufficiently wide to allow the particles to evacuate from contact area 326 through vacuum channel 324.

Figure 4A:
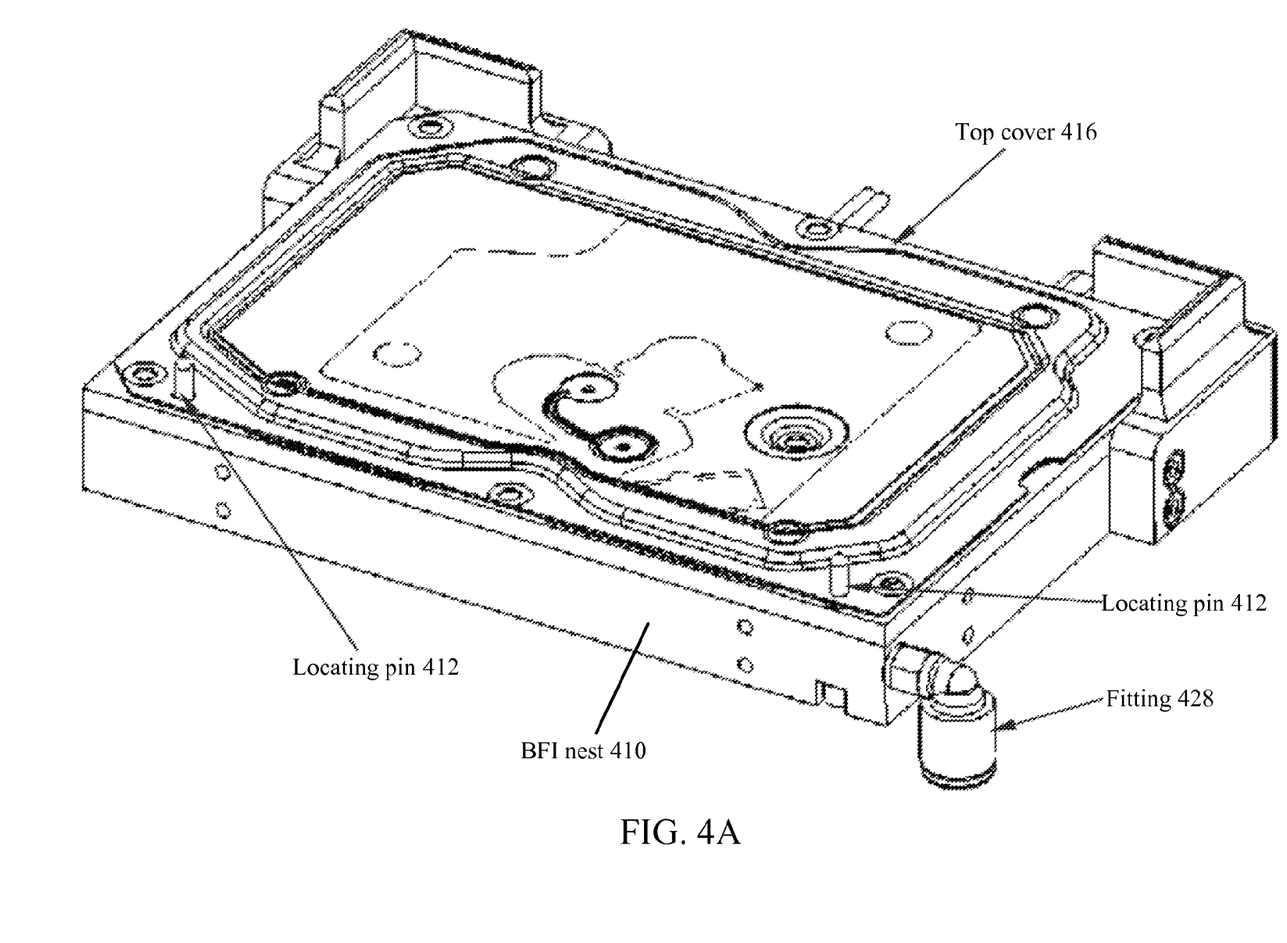
FIGS. 4A and 4B illustrate a breather filter install (BFI) nest as an example of an assembly tool, and a top cover of a hard drive as an example of a hard drive component, in accordance with various aspects of the subject technology.
Figure 4B:
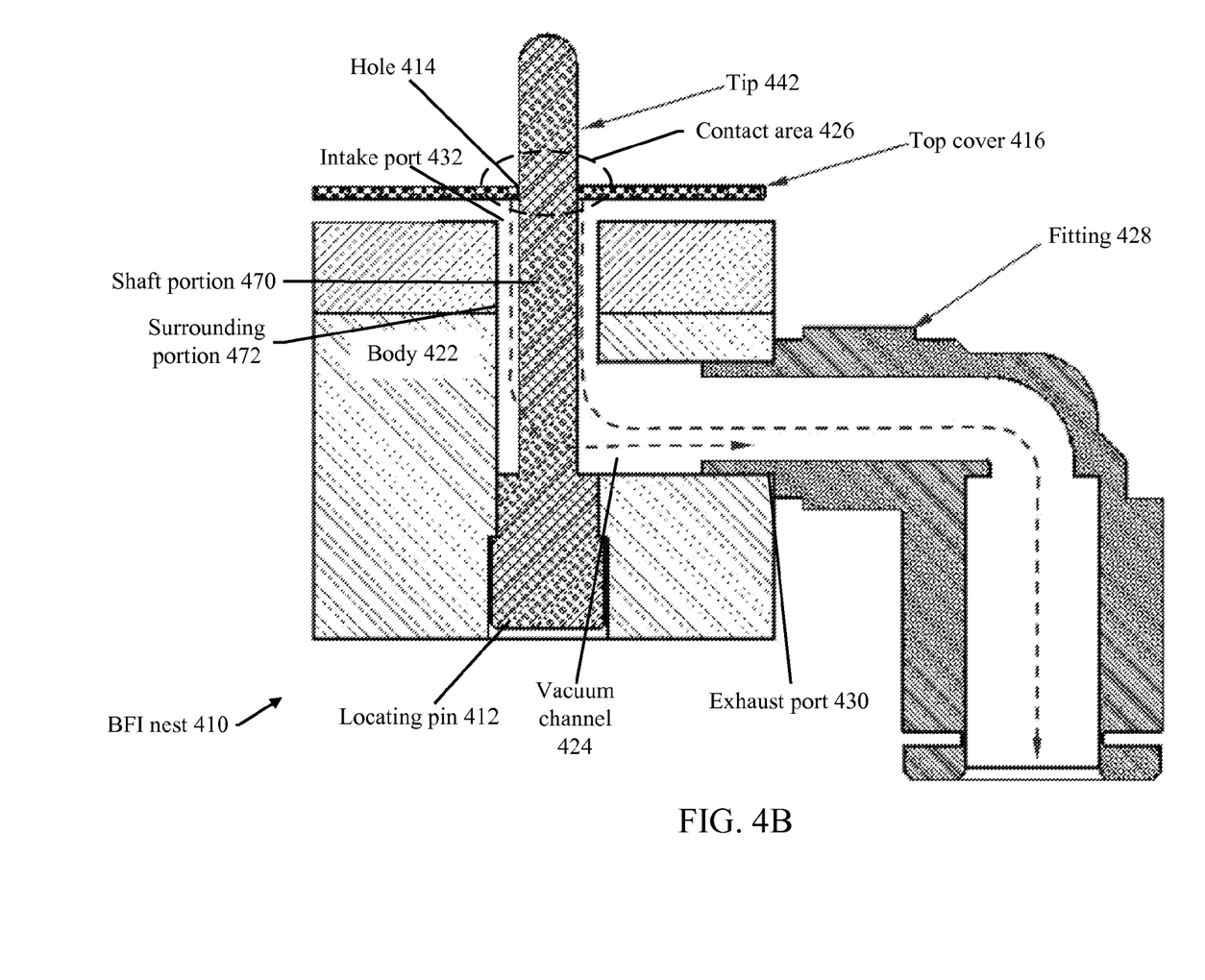

FIGS. 4A and 4B illustrate BFI nest 410 as an example of an assembly tool, and top cover 416 of a hard drive as an example of a hard drive component, in accordance with various aspects of the subject technology. In particular, FIG. 4A illustrates a perspective view of BFI nest 410 and top cover 416. Top cover 416 may be placed onto BFI nest 410, for example, so that a breather filter may then be installed onto top cover 416. In some aspects, BFI nest 410 comprises two locating pins 412 configured to engage alignment features of top cover 416. In this example, the alignment features of top cover 416 are holes which locating pins 412 may engage to align top cover 416 with BFI nest 410. However, BFI nest 410 may comprise more or less locating pins depending on the size and shape of top cover 416 for aligning top cover 416 with BFI nest 410. Particles generated as a result of contact between locating pins 412 and top cover 416 may be evacuated in a manner similar to the examples presented in FIGS. 1A, 1B, 2A, 2B, 3A and 3B.

FIG. 4B illustrates a cross-sectional view of BFI nest 410 and top cover 416 shown in FIG. 4A, in accordance with various aspects of the subject technology. Although BFI nest 410 comprises two locating pins 412 as shown in FIG. 4A, FIG. 4B illustrates only a portion of BFI nest 410 at one locating pin 412. However, the portion of BFI nest 410 at the other locating pin 412 is arranged similarly. BFI nest 410 comprises body 422, vacuum channel 424 defined within body 422, and locating pin 412 attached to body 422. Locating pin 412 has shaft portion 470 arranged within surrounding portion 472 of body 422. Locating pin 412 is configured to engage hole 414, which is an example of an alignment feature, of top cover 416. Locating pin 412 may extend through hole 414 at contact area 426 to align top cover 416 with BFI nest 410.

According to various aspects of the subject technology, body 422 is configured to couple vacuum channel 424 to a vacuum source (not shown) and to facilitate particle evacuation from contact area 426 via vacuum channel 424 when a vacuum is applied by the vacuum source. Vacuum channel 424 comprises a path beginning from intake port 432, through a space between shaft portion 470 and surrounding portion 472, through body 422, and through exhaust port 430. In some aspects, BFI nest 410 comprises fitting 428 mounted to exhaust port 430 of vacuum channel 424. Fitting 428 is configured to couple the vacuum source to exhaust port 430.

In some aspects, intake port 432 is oriented towards contact area 426. For example, intake port 432 may face contact area 426. Thus, when particles are generated as a result of the contact between locating pin 412 and top cover 416, the vacuum may be applied to evacuate the particles from contact area 426 via vacuum channel 424 (e.g., as illustrated by the path of the dotted arrows in FIG. 4B). For example, the particles may be evacuated from contact area 426 through intake port 432, through the space between shaft portion 470 and surrounding portion 472, and through fitting 428 toward the vacuum source. In some aspects, a filter may be placed between vacuum channel 424 and the vacuum source to capture the particles evacuated from contact area 426.

In some aspects, the vacuum applied may be sufficiently strong to evacuate the particles from contact area 426. For example, the vacuum may be applied at a pressure of 26 inches of Mercury (in Hg). In some aspects, the vacuum may be applied such that a flowrate of 350 liters per minute (l/min) through vacuum channel 424 is created. According to various aspects of the subject technology, the vacuum may be continuously applied when locating pin 412 engages hole 414. In some aspects, the vacuum may be applied before locating pin 412 engages hole 414. In some aspects, the vacuum may be applied until after locating pin 412 has disengaged from hole 414 (e.g., when top cover 416 is picked from BFI nest 410).

In some aspects, tip 442 of locating pin 412 extends distally beyond intake port 432 of vacuum channel 424, as shown in FIG. 4B. According to various aspects of the subject technology, a separation between an inner wall of surrounding portion 472 and shaft portion 470 may be sufficiently wide to allow the particles to evacuate through vacuum channel 424. For example, the particles may comprise diameters of 0.5 micrometers or less. In some aspects, the separation may be between 0.25 millimeters and 1.36 millimeters. In one example, the separation may be 0.96 millimeters, which may be sufficiently wide to allow the particles to evacuate from contact area 426 through vacuum channel 424.

Figure 5:
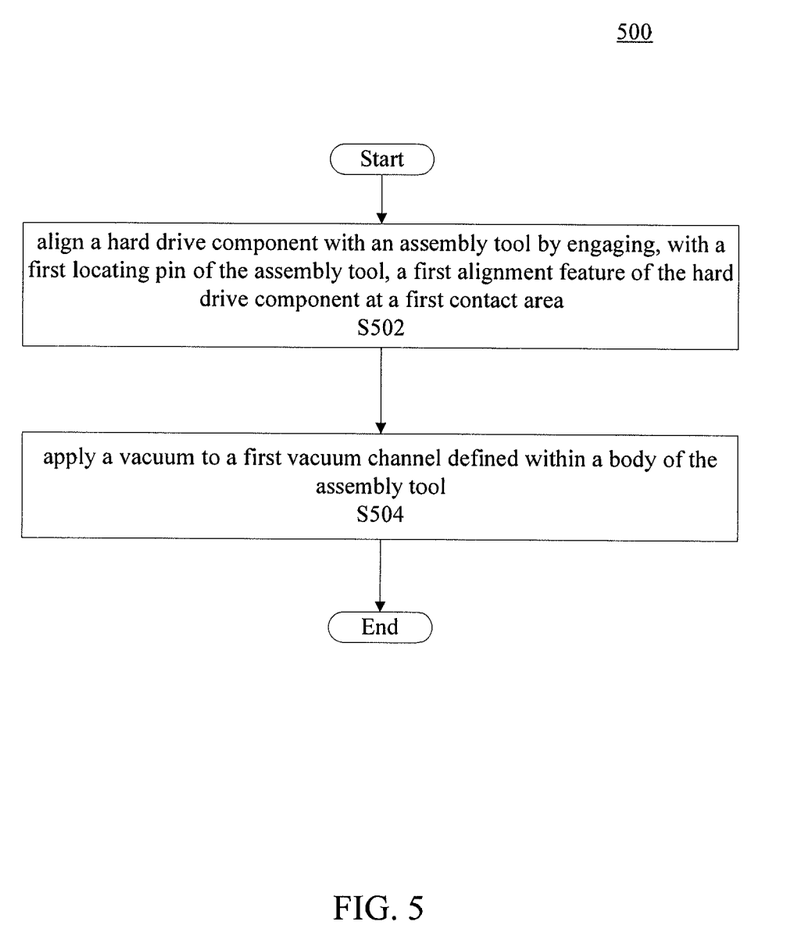
FIG. 5 illustrates an example of a method for evacuating particles from a hard drive component.

FIG. 5 illustrates an example of method 500 for evacuating particles from a hard drive component. Method 500 comprises the step of aligning a hard drive component with an assembly tool by engaging, with a first locating pin of the assembly tool, a first alignment feature of the hard drive component at a first contact area (S502). Method 500 also comprises applying a vacuum to a first vacuum channel defined within a body of the assembly tool (S504). In some aspects, a shaft portion of the first locating pin is arranged within a surrounding portion of the body. In some aspects, the vacuum is applied to evacuate particles from the first contact area via the first vacuum channel.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method for evacuating particles from a hard drive component, the method comprising:

aligning a hard drive component with an assembly tool by engaging, with a first locating pin of the assembly tool, a first alignment feature of the hard drive component at a first contact area; and applying a vacuum to a first vacuum channel defined within a body of the assembly tool, wherein a shaft portion of the first locating pin is arranged within a surrounding portion of the body, and wherein the vacuum is applied to evacuate particles between the locating in and the surrounding portion via the first vacuum channel.

2. The method of claim 1, further comprising coupling a vacuum source to an exhaust port of the first vacuum channel via a fitting.

3. The method of claim 2, further comprising placing a filter between the first vacuum channel defined within the body and the vacuum source to capture particles evacuated from the first contact area.

* * * * *